United States Patent
Mosko

(10) Patent No.: US 10,489,090 B1
(45) Date of Patent: Nov. 26, 2019

(54) SYSTEM AND METHOD FOR DETECTING PRINTER MOVES IN A MANAGED PRINT ENVIRONMENT

(71) Applicant: Palo Alto Research Center Incorporated, Palo Alto, CA (US)

(72) Inventor: Marc E. Mosko, Santa Cruz, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 0 days.

(21) Appl. No.: 16/052,105

(22) Filed: Aug. 1, 2018

(51) Int. Cl.
*G06F 3/12* (2006.01)

(52) U.S. Cl.
CPC ............ *G06F 3/121* (2013.01); *G06F 3/1231* (2013.01); *G06F 3/1288* (2013.01)

(58) Field of Classification Search
None
See application file for complete search history.

(56) References Cited

U.S. PATENT DOCUMENTS

| | | | | |
|---|---|---|---|---|
| 2005/0068565 A1* | 3/2005 | Maeda | ............. | H04L 29/12113 358/1.15 |
| 2011/0238800 A1* | 9/2011 | Ishimoto | ........... | H04L 29/12028 709/221 |

* cited by examiner

*Primary Examiner* — Thomas D Lee
(74) *Attorney, Agent, or Firm* — Shun Yao; Park, Vaughan, Fleming & Dowler LLP

(57) ABSTRACT

One embodiment facilitates discovery of printers. During operation, the system determines, by a management system which manages a plurality of printers, that a printer is unresponsive to messages sent to a first IP address associated with the printer. The system generates, based on a MAC address of the printer, a DHCP Lease Query in order to obtain a current IP address which corresponds to the MAC address. In response to sending the Lease Query to a DHCP server which manages IP addresses for the printer, the system receives the current IP address of the printer. The system sends, based on the current IP address, a second message to the printer to determine whether the printer is responsive. In response to determining that the printer is responsive, the system regains control of the printer, thereby causing the management system to retain control over printers which change their respective IP address.

18 Claims, 9 Drawing Sheets

SYSTEM AND METHOD FOR DETECTING PRINTER MOVES IN A MANAGED PRINT ENVIRONMENT

RELATED APPLICATION

Field

The subject matter of this application is related to the subject matter in the following application: U.S. patent application Ser. No. 16/045,504, entitled "SYSTEM AND METHOD FOR AUTOMATIC ON-BOARDING OF PRINTERS IN A PRINTER MANAGEMENT SYSTEM," by inventor Marc Mosko, filed 25 Jul. 2018 (hereinafter "U.S. patent application Ser. No. 16/045,504"), the disclosure of which is herein incorporated by reference in its entirety.

BACKGROUND

Field

This disclosure is generally related to device discovery. More specifically, this disclosure is related to a system and method detecting printer moves in a managed print environment.

Related Art

The proliferation of the Internet and e-commerce continues to create a vast amount of digital content. An enterprise or large corporation may include a network of printers to handle tasks associated with physically printing out digital content. In such a network of printers, a printer management system may manage printers on multiple sub-networks. A conventional printer management system manages printers based on, e.g., a Simple Network Management Protocol (SNMP) query, which is based on the Internet Protocol (IP) address of the managed printer. If a printer is assigned a new IP address by a Dynamic Host Configuration Protocol (DHCP) server, the printer essentially vanishes from the printer management system due to the change in its IP address (i.e., a "moved printer" or an "unresponsive printer"). Similarly, if the printer is physically unplugged or moved onto a new sub-network (creating a new IP address for the printer), the printer management system is also unable to see the printer due to the change in its IP address.

In the conventional printer management system, the system can detect such moved or unresponsive printers by scanning a sub-network, e.g., via an SNMP query or a Hypertext Transfer Protocol (HTTP) query. However, a large enterprise may include a nationwide network with millions of devices. Scanning each sub-network using an SNMP or HTTP query to ping each of the millions of devices to detect a moved printer can be costly (e.g., computationally expensive) and inefficient. This can result in an inefficient printer management system for managing and detecting moved or unresponsive printers on sub-networks of the network of the enterprise.

SUMMARY

One embodiment facilitates discovery of printers. During operation, the system determines, by a management system which manages a plurality of printers, that a printer is unresponsive to messages sent to a first IP address associated with the printer. The system generates, based on a Media Access Control (MAC) address of the printer, a first message, which is a DHCP Lease Query, in order to obtain a current IP address which corresponds to the MAC address. In response to sending the first message to a DHCP server which manages IP addresses for the printer, the system receives the current IP address of the printer. The system sends, based on the current IP address, a second message to the printer to determine whether the printer is responsive. In response to determining that the printer is responsive, the system regains control of the printer, thereby causing the management system to retain control over printers which change their respective IP address.

In some embodiments, determining that the printer is unresponsive to messages sent to the first IP address comprises monitoring an event log of the DHCP server.

In some embodiments, determining that the printer is unresponsive to messages sent to the first IP address comprises receiving, from the DHCP server, dynamic domain name system (DNS) updates.

In some embodiments, generating the first message which is the DHCP Lease Query is further based on a client identifier of the printer.

In some embodiments, the system detects, by a network probe, a third message which is broadcast from the printer based on a network communication protocol. The system determines, by the network probe, a classification which indicates a type for the printer based on the MAC address of the printer, wherein the MAC address is extracted from the third message. The system stores, by the network probe in a data structure, an entry which includes the MAC address, a second IP address of the printer obtained based on the third message, and the classification of the printer.

In some embodiments, in response to detecting, by the network probe, an update to the entry to replace the stored second IP address with a new IP address, the system: sends, by the network probe to the management system, a fourth message which indicates the MAC address and the new IP address, wherein the fourth message further indicates that the new IP address is a newly associated IP address for the MAC address; receives, by the management system, the fourth message; sends, by the management system based on the new IP address indicated in the fourth message, a fifth message to the printer to determine whether the printer is responsive; and in response to determining, by the management system based on the fifth message, that the printer is responsive, regains control of the printer.

In some embodiments, the system configures, by the management system, the printers to send a trap message in response to a respective printer booting up or changing a configuration of the respective printer. The system receives, by the management system from a second printer, a coldStart trap message or a warmStart trap message which includes a second IP address of the second printer. The system sends a third message to the second printer based on the second IP address to determine identifying information for the second printer, wherein the identifying information includes one or more of: a name for the second printer; a MAC address of the second printer; and a serial number of the second printer.

In some embodiments, the system generates, based on a second IP address of a second printer, a third message which is a DHCP Lease Query for a second MAC address which corresponds to the second IP address. In response to sending the third message to the DHCP server, the system receives the second MAC address. The system queries the second printer based on applying a rule which includes one or more of: whether the second MAC address belongs to a predefined set of printers; and whether an organizationally unique identifier (OUI) extracted from the second MAC address belongs to a predefined set of OUIs.

In some embodiments, the system stores, by the management system in an entry in a data structure, the MAC address and the current IP address of the printer. In response to detecting, by the management system, an update to the entry to replace the stored current IP address with a new IP address, the system: sends, based on the new IP address, a third message to the printer to determine whether the printer is responsive; and in response to determining, based on the third message, that the printer is responsive, regains control of the printer.

Another embodiment facilitates discovery of printers. The system configures, by a management system which manages a plurality of printers, the printers to use the management system to perform a required network service. The system receives a first request from a printer to perform the required network service, wherein the first request includes identifying information of the printer. The system extracts, by the management system, a MAC address and an IP address of the printer from the identifying information. The system stores, in an entry in a data structure, the MAC address and the IP address of the printer. The system detects an update to the entry to replace the stored IP address with a new IP address. The system sends, based on the new IP address, a second message to the printer to determine whether the printer is responsive. In response to determining that the printer is responsive, the system regains control of the printer, thereby causing the management system to retain control over printers which change their respective IP address.

In some embodiments, the management system provides the required network service to the plurality of printers.

BRIEF DESCRIPTION OF THE FIGURES

In the figures, like reference numerals refer to the same figure elements.

DETAILED DESCRIPTION

Figure 1A:
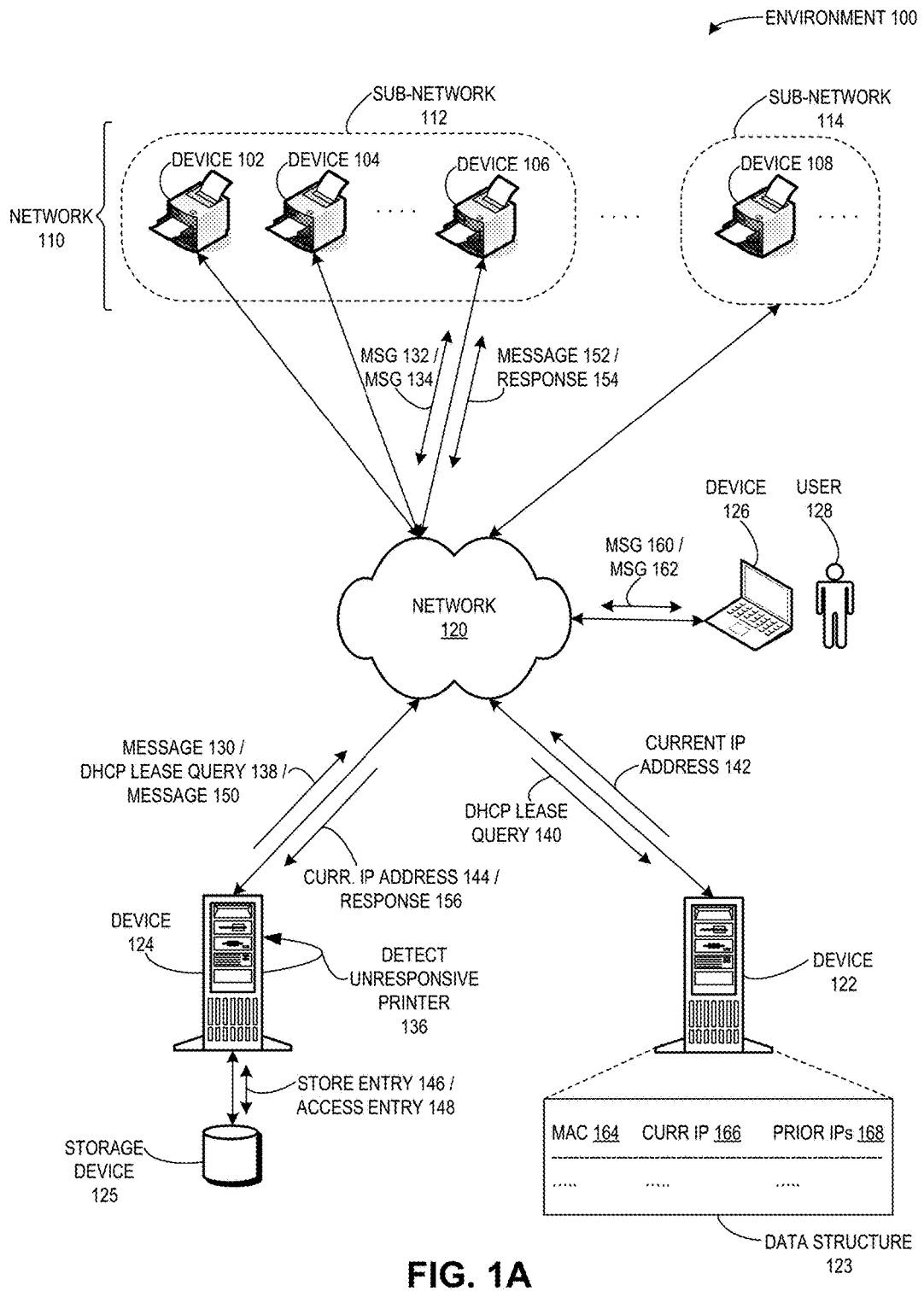
FIG. 1A illustrates an exemplary environment for facilitating discovery of unresponsive printers, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which solves the time-consuming and high traffic-generating problems resulting from the conventional detection of unresponsive printers, which involves subnet scanning of and communicating with all the devices on a sub-network.

An enterprise or large corporation may include a network of printers to handle tasks associated with printing out digital content. In such a network of printers, a printer management system may manage printers on multiple sub-networks. A conventional printer management system manages printers by sending an SNMP query, which is based on the IP address of the managed printer. If a printer is assigned a new IP address (e.g., by a DHCP server, or by moving to a new sub-network), the "moved" printer essentially vanishes from or becomes unresponsive to the printer management system. In the conventional printer management system, the system can detect such moved or unresponsive printers by scanning a sub-network, e.g., via an SNMP or an HTTP query. However, a large enterprise may include a nationwide network with millions of devices. Scanning each sub-network using an SNMP or HTTP query to ping each of the millions of devices to detect a moved printer can be costly (e.g., computationally expensive) and inefficient. This can result in an inefficient printer management system for managing and detecting moved or unresponsive printers on sub-networks of the network of the enterprise.

The embodiments described herein provide a system which overcomes the inefficiencies of a conventional printer management system by using event notifications to detect the moves. The system can determine that a printer is unresponsive based on a known IP address of the printer. For example, the system can send an SNMP query to the printer's known IP address and receive a response which indicates that the printer is no longer reachable at or responsive to a query to the known IP address. Using the printer's MAC address, the system can send a DHCP Lease Query message to the DHCP server which manages (and assigns) IP addresses for the printer, to obtain the current IP address associated with the printer's MAC address. The system can subsequently send a message to the printer, based on the current IP address, to determine whether the printer is responsive. For example, the system can send an SNMP or an HTTP query or other ping to the printer. If the printer is responsive, the system can regain control of the printer.

The system can also use the DHCP Lease Query message to, in effective, scan IP sub-networks without actually scanning them. The system can send DHCP Lease Queries to the DHCP server to find active leases, and only interrogate a network device as needed, e.g., by applying classification rules to query only printers with certain MAC address or organizationally unique identifiers (OUIs), as described in U.S. patent application Ser. No. 16/045,504.

In the embodiments described herein, the system can also configure its managed printers to perform a required network service, which allows the system to see all source IP addresses that perform the required network service. For example, the system can itself function as a network time protocol (NTP) server, allowing the system to see all source IP addresses from the managed printers which query the system for time. The system can subsequently correlate these IP addresses to printers, and further query IP addresses which are not known or may have changed.

Thus, the embodiments described herein provide a computer system which improves the ability of a system to detect unresponsive printers in a large network comprised of multiple sub-networks, where the number of total devices across the large network and included in all of the multiple sub-networks is very large, e.g., in the hundreds of thousands, millions, or more. By effectively and efficiently detecting unresponsive printers, the printer management system can efficiently regain control of the unresponsive printer. The system thus enhances and improves the technological area of device discovery by using event notifications, which eliminates the need for the printer management system to communicate directly with each and every device that becomes unresponsive in a single sub-network or in a group of sub-networks (e.g., sub-network scanning).

The claimed system is a technological solution (a system which detects unresponsive printers, communicates with the DHCP server, and regains control of an unresponsive printer) to a technological problem (detecting devices which are moved or become unresponsive in a large network with a huge number of devices). Furthermore, the improvements are fundamentally technological, can result in a more efficient printer management system, and can be applied to a variety of practical, concrete, and tangible applications, as described herein.

Overview of Exemplary Communications with a DHCP Server to Detect Unresponsive Printers A printer management system can communicate with a DHCP server in several different ways to facilitate detection of unresponsive printers. A DHCP server is typically responsible for assigning and managing IP addresses for, e.g., a sub-network or a company or other organization.

DHCP Lease Query:

The printer management system can use a DHCP Lease Query message to query a DHCP server by MAC address to obtain a corresponding IP address for the MAC address. Thus, when a printer becomes unresponsive (e.g., no longer responds to normal SNMP traffic over IP), the printer management system can query the DHCP server for a current IP address of the unresponsive printer, and use the current IP address to confirm and regain control over the printer. The printer management system can also use a DHCP Lease Query message to query the DHCP server by the client identifier, rather than by the MAC address, thus allowing for a scan for systems with a known printer name. Security mechanisms may be implemented in the DHCP server to limit access to the DHCP Lease Query protocol, e.g., an administrator may add the printer management system as an authorized user of the DHCP Lease Query messages.

DHCP Server Event Monitoring:

The DHCP server may also be configured to log audit events, and the printer management system can monitor those logged events. For example, in a Microsoft environment, the DHCP Audit Log records, among other things, the IP address, the Hostname, and the MAC address of the lease event. Event ID 10 corresponds to when a new lease is given to a client; event ID 11 corresponds to when a lease is renewed by a client; and event ID 12 corresponds to when a lease is released. Each of these events can be logged with sufficient information for the printer management system to track the printer moves. A system administrator can configure permissions on the DHCP server to forward event log entries to the printer management system. Alternatively, the system administrator can grant permission to the printer management system to remotely read the event log of the DHCP server.

As another example, in the Linux or Unix environment, a system administrator can configure the syslog service to forward certain events to a syslog reader on the printer management system. Popular DHCP servers, such as the Internet Systems Consortium (ISC) DHCP Server, can execute arbitrary scripts on lease events, and those scripts can send messages (or notifications) to the printer management system. Alternatively, the printer management system can use a remote control interface, such as the Object Management Application Programming Interface (OMAPI).

DHCP DNS Event Notifications:

Most DHCP servers support dynamically updating domain name system (DNS) entries when a DHCP server creates, renews, or removes an IP lease. The printer management system can be configured to receive DNS updates as if the printer management system were a DNS server (including optional security). A DNS update may only include the name and the IP address of the printer, so further matching and correlating may be performed based on the name of the printer.

Replacing Sub-Network Scans:

In some embodiments, the printer management system can use the DHCP Lease Query message to replace subnet scans which use PING and SNMP GET messages. The printer management system can send to the DHCP server a DHCP Lease Query message to first determine whether there is a lease for a given IP address. If there is an active lease for a given IP address, the DHCP server can return to the printer management system a corresponding MAC address for the given IP address. The printer management system can subsequently compare the received corresponding MAC address to a list of known or previously defined printer MAC addresses. Based on the comparison (i.e., determining whether the MAC address corresponds to a printer), the printer management system can perform standard probing techniques to determine if the active leaseholder is a printer.

Exemplary Environment and Communication with DHCP Server

FIG. 1 illustrates an exemplary environment 100 for facilitating discovery of unresponsive printers, in accordance with an embodiment of the present invention. Environment 100 can include a network 110 which includes multiple sub-networks (e.g., a sub-network 112 and a sub-network 114). Sub-network 112 can include multiple devices, including a device 102, a device 104, and a device 106. Sub-network 114 can also include multiple devices, including a device 108. Devices in a sub-network can be a same type of device, e.g., all printers.

Environment 100 can also include: a device 122; a device 124 coupled to a storage device 125; and a device 126 with an associated user 128. Device 122 can be a DHCP server which is responsible for managing and assigning IP addresses to printers in one or more sub-networks (e.g., 112 and/or 114). Device 124 can be a device management system, such as a printer management system, and devices 102-108 can be printers. Device 126 can be a client computing device, e.g., a laptop computer, a mobile telephone, a smartphone, a tablet, a desktop computer, and a handheld device. Devices 102-108, 122, 124, and 126 can communicate with each via a network 120.

During operation, printer management system 124 can send a message 130 to printer 106, and receive an indication (via communications 132 and 134, or no response) that printer 106 is unresponsive. Based on message 130, printer management system 124 can detect the unresponsive printer (function 136). Printer management system 124 can generate and send a DHCP lease query 138 to DHCP server 122, based on the MAC address for printer 106, to obtain the current IP address for printer 106. DHCP server 122 can receive DHCP Lease Query 138 (as DHCP Lease Query 140), perform a lookup in a data structure 123, and return a current IP address 142 corresponding to the MAC address indicated in DHCP Lease Query 140. Printer management system 124 can receive current IP address 142 (as current IP address 144), store (i.e., update) the current IP address in storage device 125 (via a communication 146), and subsequently access the stored entry (via a communication 148).

Printer management system 124 can send a message 150 to printer 106, based on the current IP address for printer 106. Upon receiving message 150 (as message 152), printer 106 can send a response 154 back to printer management system 124. Messages 150/152 and response 154 may be an SNMP query and corresponding response, or other communication request/response which is based on a network communication protocol which uses the IP address of a target device. Printer management system 124 can receive the response 154 (as a response 156), determine that printer 106 is responsive, and regain control of printer 106.

After printer management system 124 regains control of printer 106, printer 106 may again appear as an available printer for use by a user who has access to the sub-network in which printer 106 resides. For example, user 128 may receive, via device 126, a message 160 that printer 106 is available for use, and user 128 may then utilize printer 106, e.g., by sending an electronic document to be physically printed out on printer 106 (via a message 162).

Figure 1B:
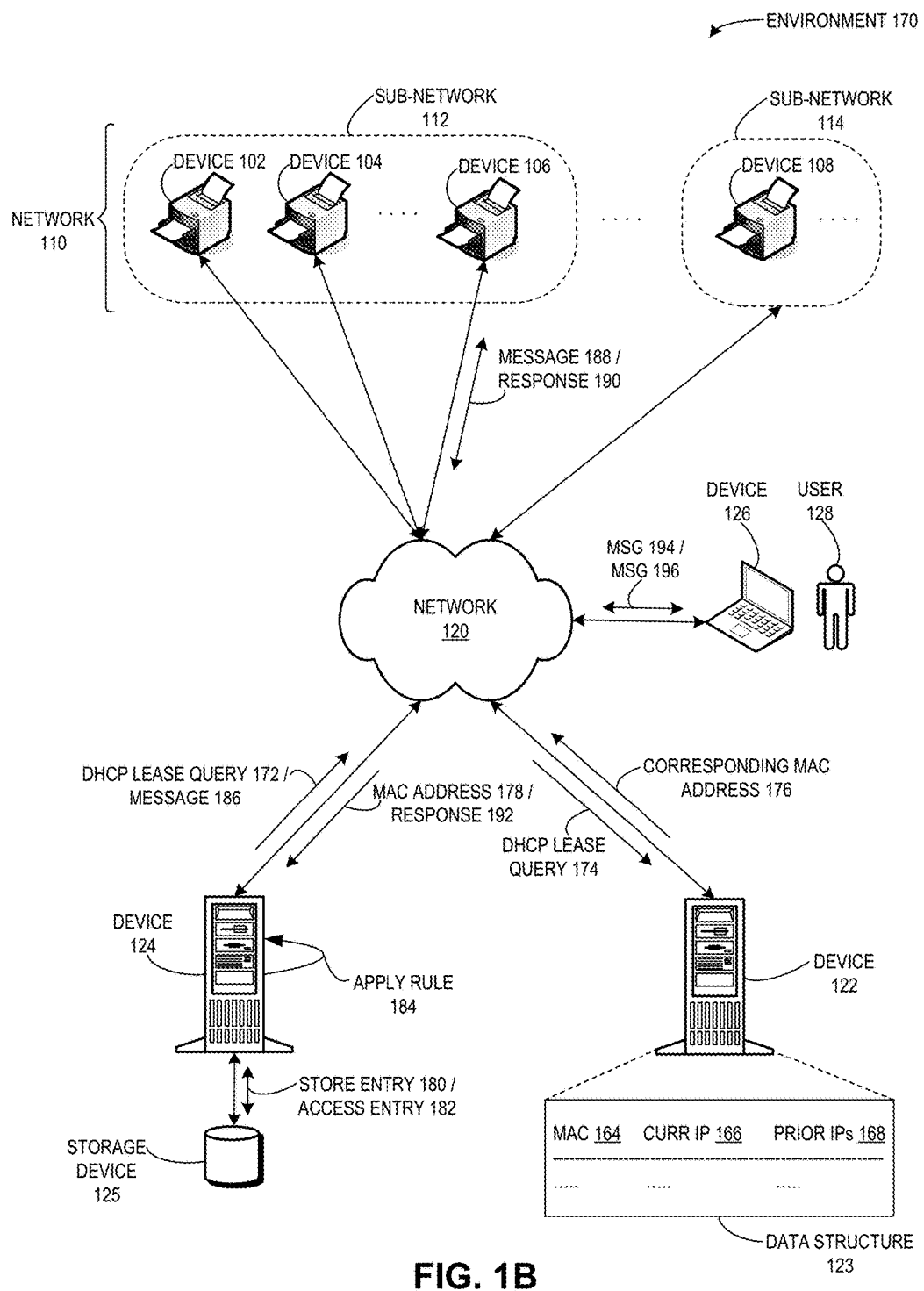
FIG. 1B illustrates an exemplary environment for facilitating discovery of unresponsive printers, in accordance with an embodiment of the present invention.

FIG. 1B illustrates an exemplary environment 170 for facilitating discovery of unresponsive printers, in accordance with an embodiment of the present invention. During operation, printer management system 124 can generate and send a DHCP lease query 172 to DHCP server 122, based on the IP address for printer 106, to obtain the MAC address for printer 106. DHCP server 122 can receive DHCP Lease Query 172 (as DHCP Lease Query 174), perform a lookup in data structure 123, and return a corresponding MAC address 176 for the IP address indicated in DHCP Lease Query 174. Printer management system 124 can receive corresponding MAC address 176 (as corresponding MAC address 178), store the corresponding MAC address in storage device 125 (via a communication 180), and subsequently access the stored entry (via a communication 182).

Printer management system 124 can apply a rule (function 184) to determine whether to query printer 106 for additional information. For example, the rule can be based on whether MAC address 178 belongs to a predefined set of printers, or on whether an OUI extracted from MAC address 178 belongs to a predefined set of OUIS. If printer management system 124 determines, based on applying the rule, to query printer 106, printer management system 124 can send a message 186 to printer 106.

Upon receiving message 186 (as message 188), printer 106 can send a response 190 back to printer management system 124. Message 188 and response 190 may be an SNMP query and corresponding response, or other communication request/response which is based on a network communication protocol which uses the IP address of a target device. Printer management system 124 can receive the response 190 (as a response 192), and determine that printer 106 is responsive, and regain control of printer 106.

After printer management system 124 regains control of printer 106, printer 106 may again appear as an available printer for use by a user who has access to the sub-network in which printer 106 resides. For example, user 128 may receive, via device 126, a message 194 that printer 106 is available for use, and user 128 may then utilize printer 106, e.g., by sending an electronic document to be physically printed out on printer 106 (via a message 196).

Thus, the embodiments described herein eliminate the need for a printer management system to perform the computationally expensive, time-consuming, and traffic-generating process of sub-network scanning (i.e., communicating directly with each and every device that becomes unresponsive in a single sub-network or in a group of sub-networks). By communicating with a DHCP server and relying on notifications (both from the DHCP server and via other embodiments, as described herein), the claimed system can result in a more efficient printer management system, and can be applied in the practical, concrete, and tangible application of detecting printer moves, i.e., discovering unresponsive printers in a large sub-network or network of a large number of printers.

Additional Embodiments to Detect Unresponsive Printers

In addition to the exemplary communications with the DHCP server described above, in some embodiments, the printer management system can use network probes to monitor for the MAC address of printers. The printer management system can send to a network probe a set of MAC addresses which correspond to and are to be classified as printers, which allows the network probe to observe a subsequent broadcast message (Address Resolution Protocol (ARP) or DHCP) which indicates a new IP address corresponding to a known MAC address from the set of pre-classified printers. Upon observing a changed IP address, a network probe can send a notification to the printer management system of a change in the associations between the MAC address and the IP address, as described in U.S. patent application Ser. No. 16/045,504.

Furthermore, the printer management system can configure its managed printers to send SNMP coldStart and warmStart traps to the printer management system. Many SNMP devices can send a coldStart trap (e.g., ".iso.org.dod.internet.snmpV2.snmpModules.snmpMIB. snmpMIBObjects.snmpTraps.coldStart") when a respective device first boots or when the configuration is altered.

In another embodiment, the printer management system can configure its managed printers to perform a required network service, which allows the system to see all source IP addresses that perform the required network service. For example, the system can configure its printers to query the system as part of performing an NTP query. The system itself can function as an NTP server, such that the system can see all source IP addresses from the managed printers which query the system for time. The system can subsequently correlate these IP addresses to printers, and further query IP addresses which are not known or may have changed.

Figure 2A:
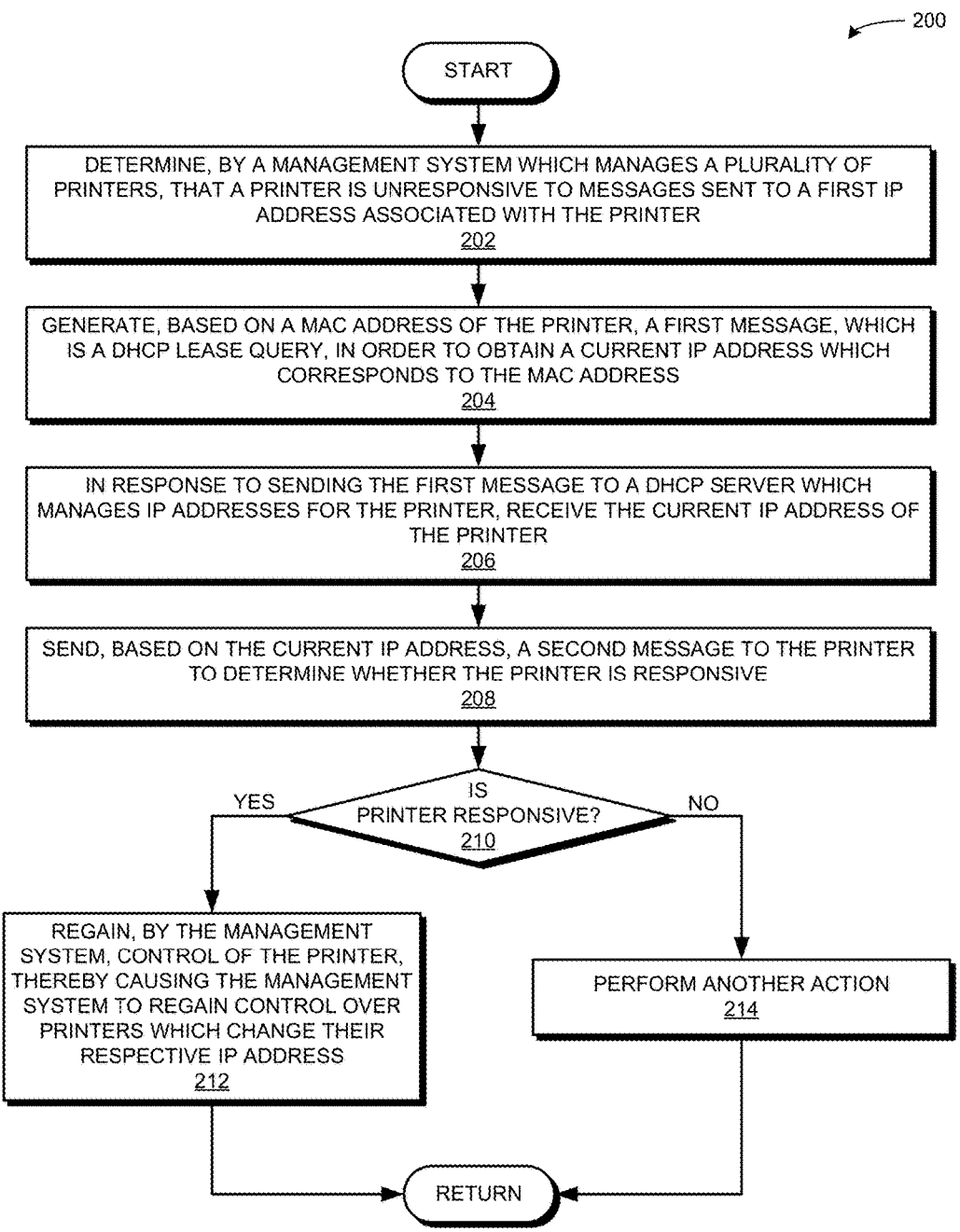
FIG. 2A presents a flow chart illustrating a method by a printer management system for facilitating discovery of unresponsive printers, in accordance with an embodiment of the present invention.

Exemplary Method for Facilitating Discovery of Unresponsive Devices: Communicating with DHCP Server FIG. 2A presents a flow chart 200 illustrating a method by a printer management system for facilitating discovery of unresponsive printers, in accordance with an embodiment of the present invention. During operation, the system determines, by a management system which manages a plurality of printers, that a printer is unresponsive to messages sent to a first IP address associated with the printer (operation 202). The management system generates, based on a MAC address of the printer, a first message, which is a DHCP Lease Query, in order to obtain a current IP address which corresponds to the MAC address (operation 204). The management system can also generate the first message based on a client identifier of the printer. In response to sending the first message to a DHCP server which manages IP addresses for the printer, the management system receives the current IP address of the printer (operation 206). The management system sends, based on the current IP address, a second message to the printer to determine whether the printer is responsive (operation 208). If the printer is responsive (decision 210), the management system regains control of the printer, thereby causing the management system to regain control over printers which change their respective IP address (operation 212). If the printer is not responsive (decision 210), the management system can perform another action (operation 214) (e.g., resending the second message immediately, resending the second message continuously at predetermined intervals, and waiting a predetermined period of time before resending the second message), and the operation returns.

The system can also determine that the printer is unresponsive or responsive (i.e., whether the printer is responsive) by monitoring an event log of the DHCP server, or by receiving from the DHCP server dynamic DNS updates.

Figure 2B:
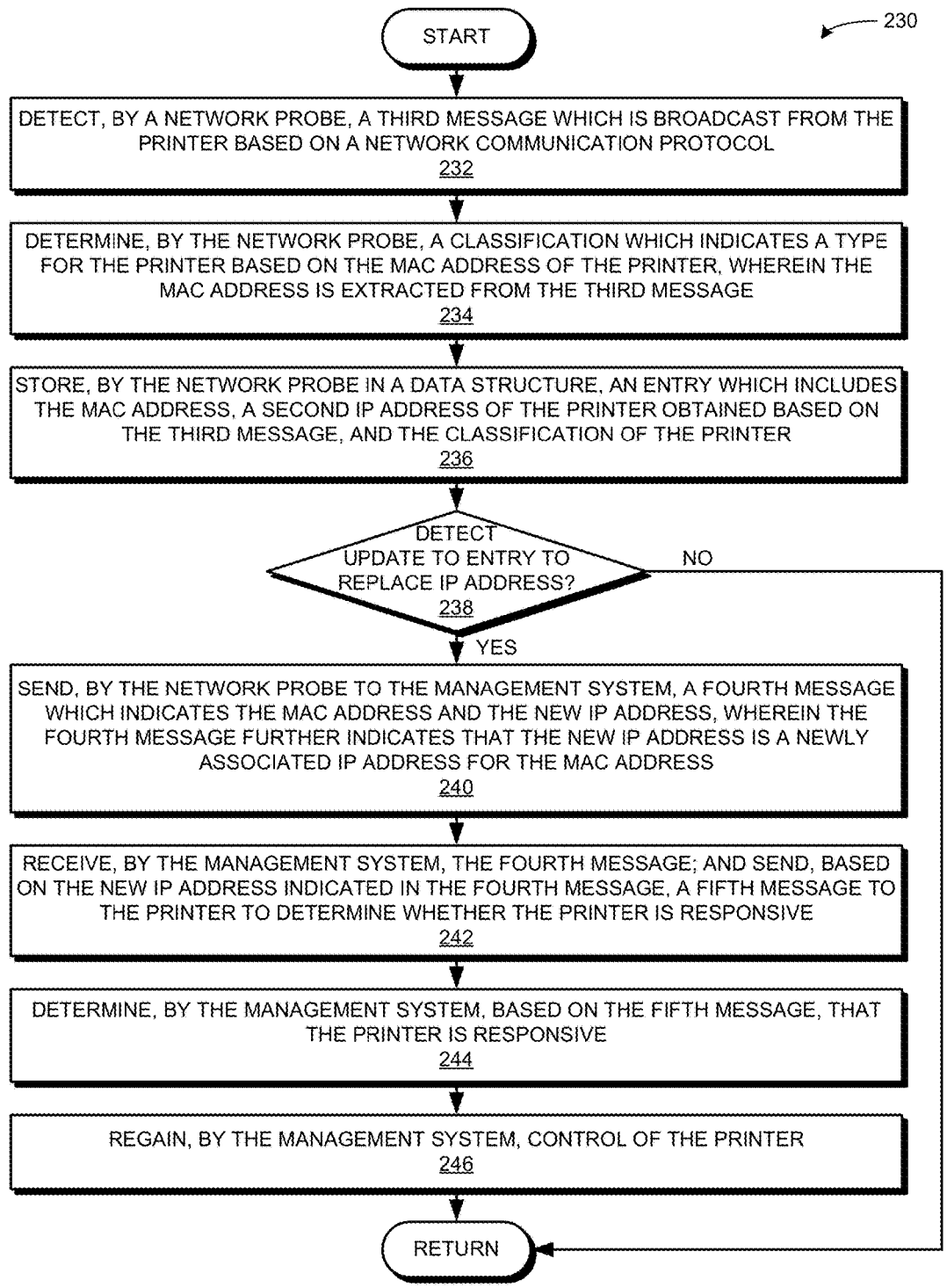
FIG. 2B presents a flow chart illustrating a method by a printer management system for facilitating discovery of unresponsive printers, in accordance with an embodiment of the present invention.

FIG. 2B presents a flow chart 230 illustrating a method by a printer management system for facilitating discovery of unresponsive printers, in accordance with an embodiment of the present invention. The operations depicted in FIG. 2B can occur concurrently with or subsequent to the operations depicted in FIG. 2A. During operation, a network probe detects a third message which is broadcast from the printer based on a network communication protocol (such as ARP or DHCP) (operation 232). The network probe determines a classification which indicates a type for the printer based on the MAC address of the printer, wherein the MAC address is extracted from the third message (operation 234). The network probe stores, in a data structure, an entry which includes the MAC address, a second IP address of the printer obtained based on the third message, and the classification of the printer (operation 236). If the network probe does not detect an update to the entry to replace the stored IP address with a new IP address (decision 238), the operation returns.

If the network probe detects an update to the entry to replace the stored IP address with a new IP address (decision 238), the network probe sends to the management system a fourth message which indicates the MAC address and the new IP address, wherein the fourth message further indicates that the new IP address is a newly associated IP address for the MAC address (operation 240). The management system receives the fourth message, and the management system sends, based on the new IP address indicated in the fourth message, a fifth message to the printer to determine whether the printer is responsive (operation 242). The management system determines, based on the fifth message, that the printer is responsive (operation 244), and regains control of the printer (operation 246). Note that operations 244 and 246 of FIG. 2B are similar to operations 210 and 212 of FIG. 2A.

Figure 2C:
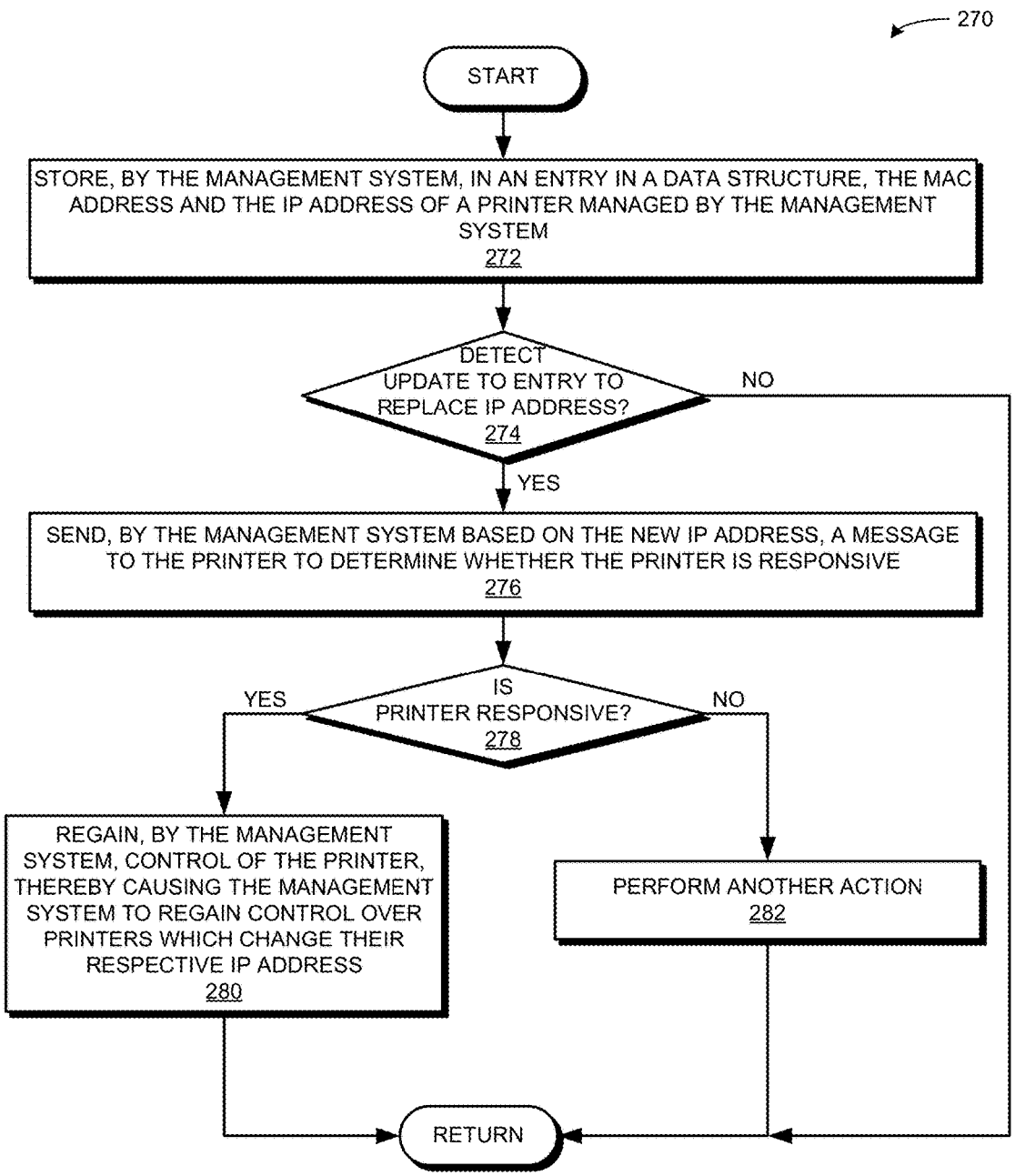
FIG. 2C presents a flow chart illustrating a method by a printer management system for facilitating discovery of unresponsive printers, in accordance with an embodiment of the present invention.

FIG. 2C presents a flow chart 270 illustrating a method by a printer management system for facilitating discovery of unresponsive printers, in accordance with an embodiment of the present invention. During operation, the management system stores, in an entry in a data structure, the MAC address and the IP address of a printer managed by the management system (operation 272). If the management system does not detect an update to the entry to replace the stored IP address (decision 274), the operation returns.

If the management system detects an update to the entry to replace the stored IP address with a new IP address (decision 274), the management system sends, based on the new IP address, a message to the printer to determine whether the printer is responsive (operation 276). If the printer is responsive (decision 278), the management system regains control of the printer (operation 280). If the printer is not responsive (decision 278), the management system can perform another action (operation 282), and the operation returns. Note that operations 278 and 280 of FIG. 2C are similar to operations 210 and 212 of FIG. 2A.

Exemplary Method for Facilitating Discovery of Unresponsive Devices

Figure 3:
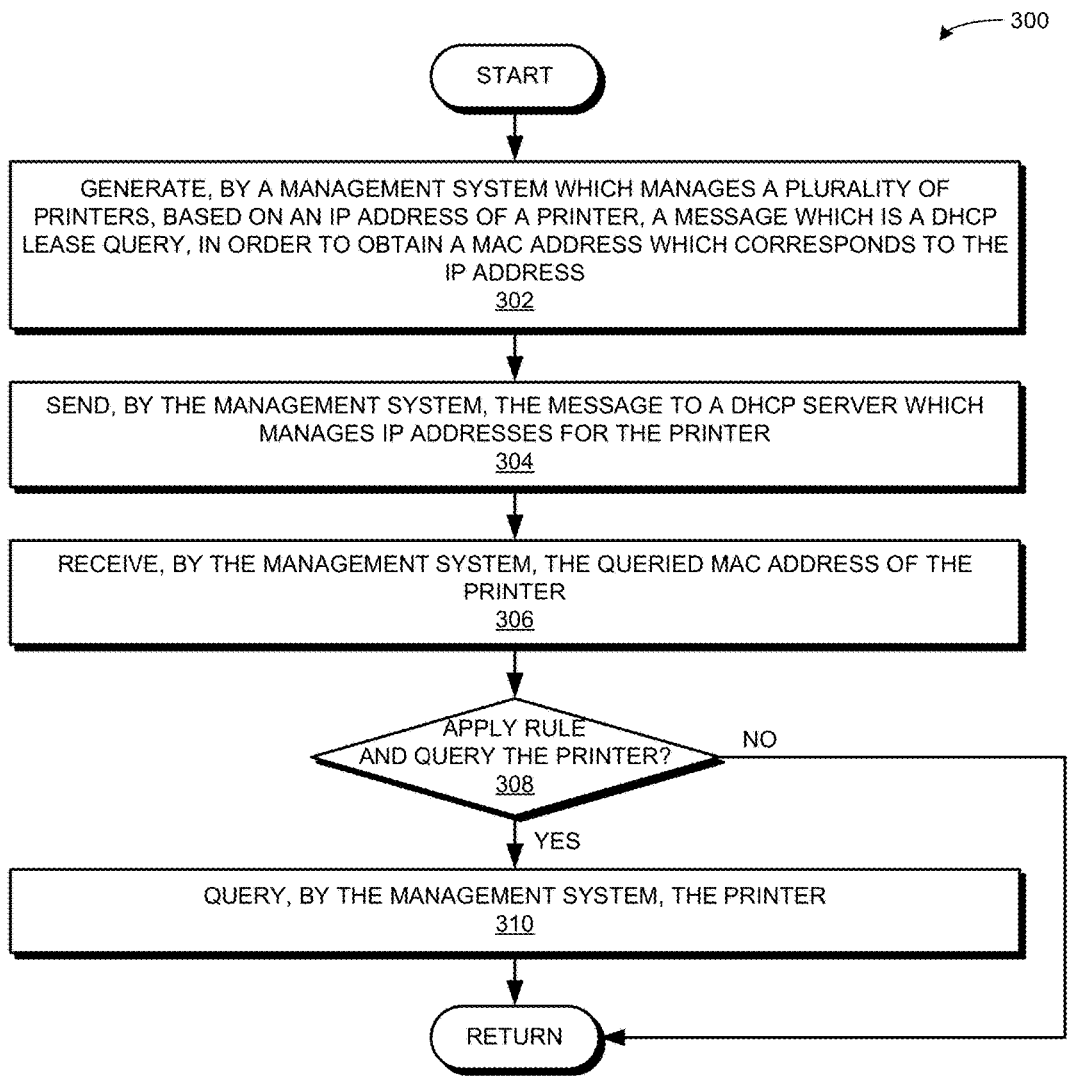
FIG. 3 presents a flow chart illustrating a method for facilitating discovery of unresponsive printers, in accordance with an embodiment of the present invention.
Figure 4:
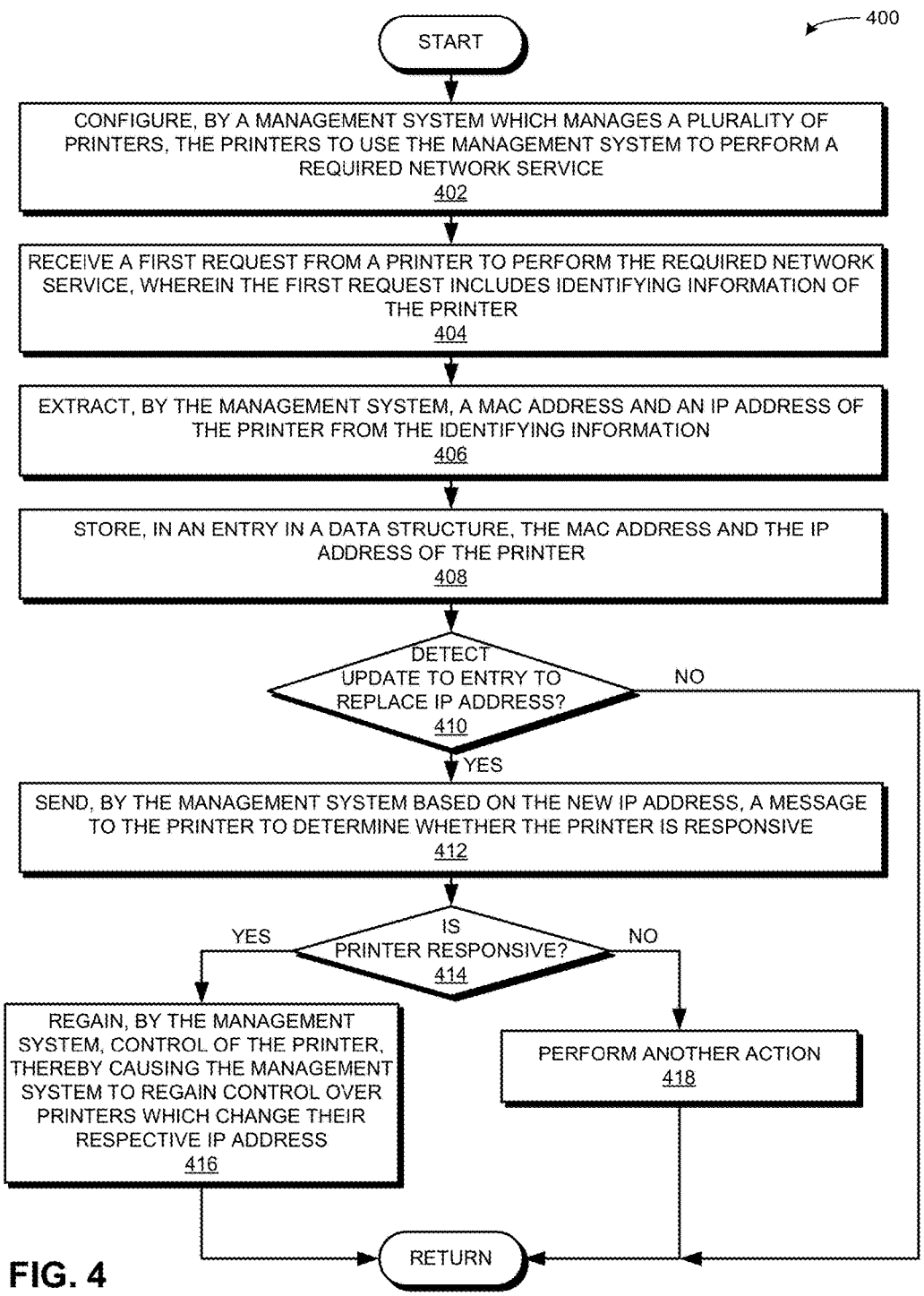
FIG. 4 presents a flow chart illustrating a method for facilitating discovery of unresponsive printers, in accordance with an embodiment of the present invention.

FIG. 3 presents a flow chart 300 illustrating a method for facilitating discovery of unresponsive printers, in accordance with an embodiment of the present invention. During operation, the system generates, by a management system which manages a plurality of printers, based on an IP address of a printer, a message which is a DHCP Lease Query, in order to obtain a MAC address which corresponds to the IP address (operation 302). The management system sends the message to a DHCP server which manages IP addresses for the printer (operation 304). The system receives the queried MAC address of the printer (operation 306). The system can apply a rule and determine whether to query the second printer (decision 308). For example, if the rule is whether the MAC address belongs to a predefined set of printers, and the MAC address does belong to the predefined set of printers, the system queries the second printer (operation 310). As another example, if the rule is whether an OUI extracted from the MAC address does not belong to a predefined set of OUIs, and the extracted OUI does not belong to the predefined set of OUIs, the operation returns.

Exemplary Computer and Communication System; Exemplary Apparatus

Figure 5:
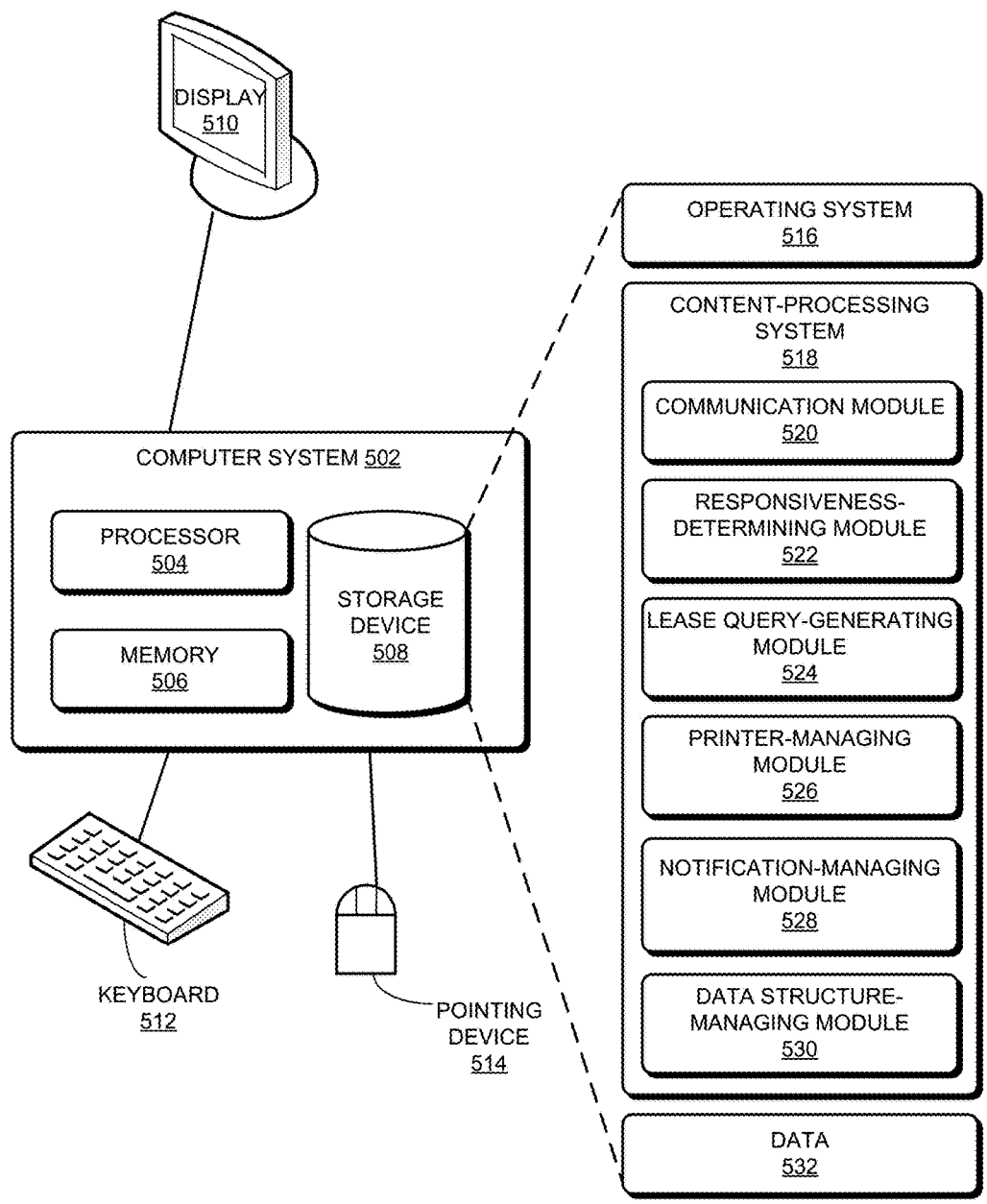
FIG. 5 illustrates an exemplary distributed computer and communication system that facilitates discovery of unresponsive printers, in accordance with an embodiment of the present invention.

FIG. 5 illustrates an exemplary distributed computer and communication system 502 that facilitates discovery of unresponsive printers, in accordance with an embodiment of the present invention. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 532.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network (communication module 520). A data packet can include data, a message, a trap message, a notification, a DHCP query, a DNS update, a broadcast message, a MAC address, an IP address, a client identifier, and a data structure entry.

Content-processing system 518 can further include instructions for determining, by a management system which manages a plurality of printers, that a printer is unresponsive to messages sent to a first IP address associated with the printer (responsiveness-determining module 522). Content-processing system 518 can include instructions for generating, based on a MAC address of the printer, a first message, which is a DHCP Lease Query, in order to obtain a current IP address which corresponds to the MAC address (lease query-generating module 524). Content-processing system 518 can include instructions for, in response to sending the first message to a DHCP server which manages IP addresses for the printer, receiving the current IP address of the printer (communication module 520). Content-processing system 518 can include instructions for sending, based on the current IP address, a second message to the printer to determine whether the printer is responsive (communication module 520). In response to determining that the printer is responsive (responsiveness-determining module 522), regaining control of the printer (printer-managing module 526), thereby causing the management system to retain control over printers which change their respective IP address (printer-managing module 526).

Content-processing system 518 can additionally include instructions for configuring printers to send a trap message in response to a respective printer booting up or changing a configuration of the respective printer (printer-managing module 526).

Content-processing system 518 can further include instructions for generating, based on a second IP address of a second printer, a third message which is a DHCP Lease Query, in order to obtain a second MAC address which corresponds to the second IP address (lease query-generating module 524). Content-processing system 518 can include instructions for, in response to sending the third message to the DHCP server, receiving the second MAC address (communication module 520). Content-processing system 518 can include instructions for querying the second printer based on applying a rule (communication module 520 and notification-managing module 528).

Content-processing system 518 can also include instructions for storing, by the management system in an entry in a data structure, the MAC address and the current IP address of the printer (data structure-managing module 530). Content-processing system 518 can include instructions for, in response to detecting, by the management system, an update to the entry to replace the stored current IP address with a new IP address (data structure-managing module 530): sending, based on the new IP address, a third message to the printer to determine whether the printer is responsive (communication module 520); and in response to determining, based on the third message, that the printer is responsive, regaining control of the printer (printer-managing module 526).

Content-processing system 518 can also include instructions for configuring, by a management system which manages a plurality of printers, the printers to use the management system to perform a required network service (printer-managing module 526). Content-processing system 518 can include instructions for receiving a first request from a printer to perform the required network service, wherein the first request includes identifying information of the printer (communication module 520). Content-processing system 518 can include instructions for extracting, by the management system, a MAC address and an IP address of the printer from the identifying information (notification-managing module 528). Content-processing system 518 can additionally include instructions for storing, in an entry in a data structure, the MAC address and the IP address of the printer (data structure-managing module 530). Content-processing system 518 can include instructions for detecting an update to the entry to replace the stored IP address with a new IP address (data structure-managing module 530). Content-processing system 518 can include instructions for sending, based on the new IP address, a second message to the printer to determine whether the printer is responsive (communication module 520). Content-processing system 518 can also include instructions for, in response to determining that the printer is responsive (communication module 520), regaining control of the printer (printer-managing module 526).

Data 532 can include any data that is required as input or that is generated as output by the methods and/or processes described in this disclosure. Specifically, data 532 can store at least: an IP address; a MAC address; a request; a message; a DHCP Lease Query; an identifier for a DHCP server; a data structure; an event log; a DNS update; a client identifier; a broadcast message; a classification; a type; an entry in a data structure; an indicator of whether a printer is responsive or unresponsive; a coldStart trap message; a warmStart trap message; identifying information for a printer; a rule; a predefined set of printers; an OUI; a predefined set of OUIs; and a network service.

Figure 6:
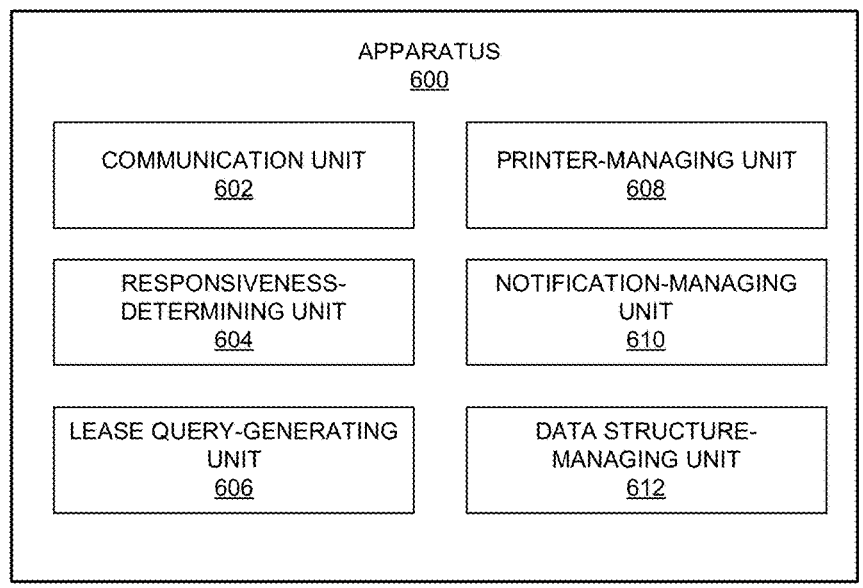
FIG. 6 illustrates an exemplary apparatus that facilitates discovery of unresponsive printers, in accordance with an embodiment of the present application.

FIG. 6 illustrates an exemplary apparatus 600 that facilitates discovery of unresponsive printers, in accordance with an embodiment of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device which is capable of communicating with other computer systems and/or devices. Specifically, apparatus 600 can comprise units 602-612 which perform functions or operations similar to modules 520-530 of computer system 502 of FIG. 5, including: a communication unit 602; a responsiveness-determining unit 604; a lease query-generating unit 606; a printer-managing unit 608; a notification-managing unit 610; and a data structure-managing unit 612.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating discovery of printers, the method comprising:
   determining, by a management system which manages a plurality of printers, that a printer is unresponsive to messages sent to a first Internet Protocol (IP) address associated with the printer,
   wherein determining that the printer is unresponsive to messages sent to the first IP address comprises monitoring an event log of a Dynamic Host Configuration Protocol (DHCP) server which manages IP addresses for the printer;
   generating, based on a Media Access Control (MAC) address of the printer, a first message, which is a Dynamic Host Configuration Protocol (DHCP) Lease Query, in order to obtain a current IP address which corresponds to the MAC address;
   in response to sending the first message to the DHCP server which manages IP addresses for the printer, receiving the current IP address of the printer;
   sending, based on the current IP address, a second message to the printer to determine whether the printer is responsive; and
   in response to determining that the printer is responsive, regaining control of the printer,
   thereby causing the management system to retain control over printers which change their respective IP address.

2. The method of claim 1, wherein determining that the printer is unresponsive to messages sent to the first IP address further comprises:
   receiving, from the DHCP server, dynamic domain name system (DNS) updates.

3. The method of claim 1, wherein generating the first message which is the DHCP Lease Query is further based on a client identifier of the printer.

4. The method of claim 1, further comprising:
   detecting, by a network probe, a third message which is broadcast from the printer based on a network communication protocol;
   determining, by the network probe, a classification which indicates a type for the printer based on the MAC address of the printer, wherein the MAC address is extracted from the third message; and
   storing, by the network probe in a data structure, an entry which includes the MAC address, a second IP address of the printer obtained based on the third message, and the classification of the printer.

5. The method of claim 4, wherein in response to detecting, by the network probe, an update to the entry to replace the stored second IP address with a new IP address, the method further comprises:
   sending, by the network probe to the management system, a fourth message which indicates the MAC address and the new IP address, wherein the fourth message further indicates that the new IP address is a newly associated IP address for the MAC address;
   receiving, by the management system, the fourth message;
   sending, by the management system based on the new IP address indicated in the fourth message, a fifth message to the printer to determine whether the printer is responsive; and
   in response to determining, by the management system based on the fifth message, that the printer is responsive, regaining control of the printer.

6. The method of claim 1, further comprising:
   configuring, by the management system, the printers to send a trap message in response to a respective printer booting up or changing a configuration of the respective printer;
   receiving, by the management system from a second printer, a coldStart trap message or a warmStart trap message which includes a second IP address of the second printer; and
   sending a third message to the second printer based on the second IP address to determine identifying information for the second printer,
   wherein the identifying information includes one or more of:
      a name for the second printer;
      a MAC address of the second printer; and
      a serial number of the second printer.

7. The method of claim 1, further comprising:
   generating, based on a second IP address of a second printer, a third message which is a DHCP Lease Query for a second MAC address which corresponds to the second IP address;
   in response to sending the third message to the DHCP server, receiving the second MAC address; and
   querying the second printer based on applying a rule which includes one or more of:
      whether the second MAC address belongs to a predefined set of printers; and
      whether an organizationally unique identifier (OUI) extracted from the second MAC address belongs to a predefined set of OUIs.

8. The method of claim 1, further comprising:
   storing, by the management system in an entry in a data structure, the MAC address and the current IP address of the printer; and
   in response to detecting, by the management system, an update to the entry to replace the stored current IP address with a new IP address:
      sending, based on the new IP address, a third message to the printer to determine whether the printer is responsive; and
      in response to determining, based on the third message, that the printer is responsive, regaining control of the printer.

9. The method of claim 1, further comprising:
   configuring, by the management system, the plurality of printers to use the management system for performing a required network service;
   receiving a first request from the printer to perform the required network service, wherein the first request includes identifying information of the printer;

extracting, by the management system, a first MAC address and a first IP address of the printer from the identifying information;

storing, in an entry in a data structure, the first MAC address and the first IP address of the printer;

detecting an update to the entry to replace the stored first IP address with a new IP address;

sending, based on the new IP address, a third message to the printer to determine whether the printer is responsive; and in response to determining that the printer is responsive, regaining control of the printer, thereby causing the management system to retain control over printers which change their respective IP address.

10. The method of claim 9, wherein the management system provides the required network service to the plurality of printers.

11. A computer system for facilitating discovery of devices, the computer system comprising:
  a processor; and
  a storage device storing instructions that when executed by the processor cause the processor to perform a method, wherein the computer system is a management system, the method comprising:
    determining, by the management system which manages a plurality of printers, that a printer is unresponsive to messages sent to a first Internet Protocol (IP) address associated with the printer,
    wherein determining that the printer is unresponsive to messages sent to the first IP address comprises monitoring an event log of a Dynamic Host Configuration Protocol (DHCP) server which manages IP addresses for the printer;
    generating, based on a Media Access Control (MAC) address of the printer, a first message, which is a Dynamic Host Configuration Protocol (DHCP) Lease Query, in order to obtain a current IP address which corresponds to the MAC address;
    in response to sending the first message to the DHCP server which manages IP addresses for the printer, receiving the current IP address of the printer;
    sending, based on the current IP address, a second message to the printer to determine whether the printer is responsive; and
    in response to determining that the printer is responsive, regaining control of the printer,
    thereby causing the management system to retain control over printers which change their respective IP address.

12. The computer system of claim 11, wherein determining that the printer is unresponsive to messages sent to the first IP address further comprises:
  receiving, from the DHCP server, dynamic domain name system (DNS) updates.

13. The computer system of claim 11, wherein generating the first message which is the DHCP Lease Query is further based on a client identifier of the printer.

14. The computer system of claim 11, wherein the method further comprises:
  detecting, by a network probe, a third message which is broadcast from the printer based on a network communication protocol;
  determining, by the network probe, a classification which indicates a type for the printer based on the MAC address of the printer, wherein the MAC address is extracted from the third message; and
  storing, by the network probe in a data structure, an entry which includes the MAC address, a second IP address of the printer obtained based on the third message, and the classification of the printer.

15. The computer system of claim 14, wherein in response to detecting, by the network probe, an update to the entry to replace the stored second IP address with a new IP address, the method further comprises:
  sending, by the network probe to the management system, a fourth message which indicates the MAC address and the new IP address, wherein the fourth message further indicates that the new IP address is a newly associated IP address for the MAC address;
  receiving, by the management system, the fourth message;
  sending, by the management system based on the new IP address indicated in the fourth message, a fifth message to the printer to determine whether the printer is responsive; and
  in response to determining, by the management system based on the fifth message, that the printer is responsive, regaining control of the printer.

16. The computer system of claim 11, wherein the method further comprises:
  configuring, by the management system, the printers to send a trap message in response to a respective printer booting up or changing a configuration of the respective printer;
  receiving, by the management system from a second printer, a coldStart trap message or a warmStart trap message which includes a second IP address of the second printer; and
  sending a third message to the second printer based on the second IP address to determine identifying information for the second printer,
  wherein the identifying information includes one or more of:
    a name for the second printer;
    a MAC address of the second printer; and
    a serial number of the second printer.

17. The computer system of claim 11, wherein the method further comprises:
  generating, based on a second IP address of a second printer, a third message which is a DHCP Lease Query for a second MAC address which corresponds to the second IP address;
  in response to sending the third message to the DHCP server, receiving the second MAC address; and
  querying the second printer based on applying a rule which includes one or more of:
    whether the second MAC address belongs to a predefined set of printers; and
    whether an organizationally unique identifier (OUI) extracted from the second MAC address belongs to a predefined set of OUIs.

18. The computer system of claim 11, wherein the method further comprises:
  storing, by the management system in an entry in a data structure, the MAC address and the current IP address of the printer; and
  in response to detecting, by the management system, an update to the entry to replace the stored current IP address with a new IP address:
    sending, based on the new IP address, a third message to the printer to determine whether the printer is responsive; and in response to determining, based on the third message, that the printer is responsive, regaining control of the printer.

\* \* \* \* \*